United States Patent
Jaffrey et al.

(10) Patent No.: US 11,392,621 B1
(45) Date of Patent: Jul. 19, 2022

(54) UNSUPERVISED INFORMATION-BASED HIERARCHICAL CLUSTERING OF BIG DATA

(71) Applicant: Pattern Computer, Inc., Friday Harbor, WA (US)

(72) Inventors: Marc Jaffrey, Seattle, WA (US); Michael Dushkoff, Colden, NY (US)

(73) Assignee: Pattern Computer, Inc., Friday Harbor, WA (US)

( * ) Notice: Subject to any disclaimer, the term of this patent is extended or adjusted under 35 U.S.C. 154(b) by 98 days.

(21) Appl. No.: 16/417,945

(22) Filed: May 21, 2019

Related U.S. Application Data (60) Provisional application No. 62/674,373, filed on May 21, 2018.

(51) Int. Cl.
| | |
|---|---|
| *G06F 16/00* | (2019.01) |
| *G06F 16/28* | (2019.01) |
| *G06N 20/20* | (2019.01) |
| *G06F 16/23* | (2019.01) |
| *G06F 16/22* | (2019.01) |

(52) U.S. Cl.
CPC ........ *G06F 16/285* (2019.01); *G06F 16/2246* (2019.01); *G06F 16/2379* (2019.01); *G06N 20/20* (2019.01)

(58) Field of Classification Search
CPC ............... G06F 16/285; G06F 16/2246; G06F 16/2379; G06N 20/20
See application file for complete search history.

(56) References Cited

U.S. PATENT DOCUMENTS

| | | |
|---|---|---|
| 6,741,983 B1 * | 5/2004 | Birdwell ............. G06F 16/2264 |
| 8,015,129 B2 | 9/2011 | Thiesson et al. |
| 8,099,733 B2 | 1/2012 | Birdwell et al. |
| 8,583,649 B2 | 11/2013 | Ailon et al. |
| 8,838,510 B2 | 9/2014 | Baughman et al. |

(Continued)

OTHER PUBLICATIONS

A.K. Jain and J.V. Moreau, Bootstrap Technique in Cluster Analysis, Sep. 16, 1986, Pattern Recognition, Pergamon Journals Ltd, vol. 20 Issue No. 5, pp. 547-568.*

(Continued)

*Primary Examiner* — Hung Q Pham
(74) *Attorney, Agent, or Firm* — Lathrop GPM LLP (57) ABSTRACT

A hierarchical cluster analyzer identifies clusters in a big data set by identifying topological structure without distance-based metrics. The hierarchical cluster analyzer stochastically partitions the big data set to create pseudo-partitions of the big data set. The stochastic partitioning may be implemented with a random forest classifier that uses ensemble techniques to reduce variance and prevent overfitting. The hierarchical cluster analyzer implements random intersection leaves (RIL), a data mining technique that grows an intersection tree by intersecting candidate sets generated from the pseudo-partitions. The hierarchical cluster analyzer updates an association matrix according to co-occurrences of data points within each leaf node of the intersection tree. These co-occurring data points exhibit a high degree of similarity, which is recorded in the association matrix. A hierarchy of clusters may then be formed by finding community structure in the association matrix.

18 Claims, 11 Drawing Sheets

(56) References Cited

U.S. PATENT DOCUMENTS

| | | | |
|---|---|---|---|
| 9,286,044 | B2 | 3/2016 | Boehm et al. |
| 9,634,906 | B2 | 4/2017 | Varney et al. |
| 9,634,918 | B2 | 4/2017 | Lipstone et al. |
| 9,892,367 | B2 | 2/2018 | Guo et al. |
| 10,318,584 | B2 | 6/2019 | Kloke et al. |
| 10,467,234 | B2 | 11/2019 | Nerurkar et al. |
| 10,489,605 | B2 | 11/2019 | Nerurkar et al. |
| 10,586,068 | B2 | 3/2020 | Nerurkar et al. |
| 10,747,740 | B2 | 8/2020 | Majumdar et al. |
| 10,891,315 | B2 | 1/2021 | Sexton et al. |
| 11,055,432 | B2 | 7/2021 | Hockenbrocht et al. |
| 11,080,333 | B2 | 8/2021 | Sexton et al. |
| 11,182,098 | B2 | 11/2021 | Stevens et al. |
| 2003/0224344 | A1 | 12/2003 | Shamir et al. |
| 2010/0005051 | A1 | 1/2010 | Agrawal et al. |
| 2013/0097103 | A1* | 4/2013 | Chari .............. G06N 20/00 706/12 |
| 2016/0042253 | A1* | 2/2016 | Sawhney .......... G06K 9/6218 382/190 |
| 2016/0267171 | A1* | 9/2016 | Wang ........... G06F 16/24554 |
| 2016/0283533 | A1 | 9/2016 | Urmanov et al. |
| 2016/0364468 | A1* | 12/2016 | Huang ............ G06F 16/285 |
| 2017/0161271 | A1* | 6/2017 | Barel ............. G06F 16/2246 |
| 2017/0323206 | A1* | 11/2017 | Alipour Khayer .... G06N 5/003 |
| 2018/0018590 | A1* | 1/2018 | Szeto ............. G06F 21/6254 |
| 2018/0048653 | A1 | 2/2018 | Nerurkar et al. |
| 2018/0131516 | A1 | 5/2018 | Meng |
| 2019/0026489 | A1 | 1/2019 | Nerurkar et al. |
| 2020/0042539 | A1 | 2/2020 | Singh et al. |
| 2020/0125568 | A1 | 4/2020 | Idicula et al. |
| 2021/0279265 | A1 | 9/2021 | Stevens et al. |

OTHER PUBLICATIONS

Assent (2012) "Clustering high dimensional data," WIREs Data Mining Knowl Discov 2012, 2, pp. 340-350.

Anaissi et al. (2013) "A balanced iterative random forest for gene selection from microarray data," BMC Bioinformatics, 14, 10 pp.

Loh (2011) "Classification and regression trees," WIREs Data Mining and Knowledge Discovery, vol. 1, 10 pp.

Jiang et al. (2004) "Cluster Analysis for Gene Expression Data: A Survey," IEEE Transactions on Knowledge and Data Engineering, vol. 16, No. 11, 17 pp.

Liu et al. (2000) "Clustering Through Decision Tree Construction," IBM Research Report RC 21695 (97737), Mar. 20, 2000, 21 pp.

Schaeffer et al. (2007) "Graph clustering," Computer Science Review I (2007), pp. 27-64.

Basu et al. (2018) "Iterative random forests to discover predictive and stable high-order interactions," PNAS, vol. 115, No. 8, pp. 1943-1948.

Ho et al. (1995) "Random Decision Forests," IEEE Conference, Aug. 14-16, 1995, Montreal, Quebec, Canada, Xplore: Aug. 6, 2002, Print ISBN: 0-8186-7128-9, DOI: 10.1109/ICDAR.1995. 598994, 5 pp.

Fang et al. (2011) "A Topology-Preserving Selection and Clustering Approach to Multidimensional Biological Data," OMICS: A Journal of Integrative Biology, vol. 15, Nos. 7 and 8, 12 pp.

Breiman (2001) "Random Forests," Machine Learning, 45, pp. 5-32.

Shah et al. (2013) "Random Intersection Trees," Submitted to arXiv on Mar. 26, 2013 (303.6223v1), 23 pp.

Ho (1998) "The Random Subspace Method for Constructing Decision Forests," IEEE Transactions on Pattern Analysis and Machine Intelligence, vol. 20, No. 8, 23 pp.

Shi et al. (2006) "Unsupervised Learning With Random Forest Predictors," Journal of Computational and Graphical Statistics, vol. 15, No. 1, pp. 118-138.

Shah et al. (2014) "Random Intersection Trees," Journal of Machine Learning Research, 15, pp. 629-654.

Manual, Version 4.0 "Setting Up, Using, And Understanding Random Forests." 33 pp.

* cited by examiner

UNSUPERVISED INFORMATION-BASED HIERARCHICAL CLUSTERING OF BIG DATA

RELATED APPLICATIONS

This application claims priority to U.S. Provisional Patent Application No. 62/674,373, filed May 21, 2018, which is incorporated herein by reference in its entirety.

BACKGROUND

The proliferation of low-cost sensors and information-sensing devices, combined with steep drops in the cost of storing data, has led to the generation of data sets so large that traditional techniques for managing, analyzing, storing, and processing these data sets are challenged. Data sets meeting this criterion, referred to in the art as "big data," arise in many fields, including genomics, meteorology, high-energy physics, predictive analytics, and business informatics. Whether a data set is "big" or not depends less on its numerical size, and more on whether the quantity is so large that it requires new approaches to data management. For some fields, a big data set may mean a few terabytes; for other fields, such as particle accelerators and internet search engines (e.g., Google), "big" could mean exabytes.

SUMMARY OF THE EMBODIMENTS

Cluster analysis seeks to group a set of data points into clusters so that the data points within a cluster are more similar to each other than to all the other data points in the set. Traditional clustering analysis techniques (e.g., k-means clustering, density-based clustering, single-linkage clustering, and complete-linkage clustering) are becoming increasingly challenged by the growing dimensionality of big data sets, particularly in the field of genomics, where studies utilizing technologies like DNA microarrays and RNA-Seq produce big data sets containing millions of data points, or more, that lie in a mathematical space with up to tens of thousands of dimensions, or more. Many prior-art clustering techniques quantify similarity of data points by using a distance-based metric (e.g., Euclidean distance or Manhattan distance) to determine how "close" data points are to each other in the mathematical space. However, points in a mathematical space become equidistant to each other in the limit of infinite dimensions. As a result, as the dimensionality of a data set grows, distance between data points becomes an increasingly meaningless measure of similarity.

Described herein is a hierarchical cluster analyzer that improves on prior-art clustering algorithms by using an information-based metric, as opposed to a distance-based metric, to identify topological structure in a data set. Advantageously, the hierarchical cluster analyzer works identically regardless of the dimensionality of the mathematical space in which the data points lie, thereby overcoming the limitations of the prior art techniques described above. The hierarchical cluster analyzer features a data mining technique referred to herein as random intersection leaves (RIL), which cooperates with a stochastic partitioning function to generate an association matrix that represents the data points as a weighted graph. The data points may then be globally clustered by identifying community structure in the weighted graph.

The stochastic partitioning function may be any machine-learning algorithm that uses stochastic methods to partition a set of inputted data points. For clarity in the following discussion, the stochastic partitioning function is presented as a random forest classifier that uses bootstrapping (i.e., random selection of data points with replacement) and feature bagging to produce a multitude of decision trees. In this case, the stochastic partitioning function outputs leaf nodes of the decision trees, also referred to herein as subsets $\gamma_i$. However, another stochastic partitioning function (e.g., artificial neural networks, convolutional neural networks, and restricted Boltzmann machines) may be used without departing from the scope hereof.

To reveal the underlying topological structure of the data set, the hierarchical cluster analyzer uses RIL to create a plurality of candidate sets, each formed from the union of randomly selected subsets $\gamma_i$. These candidate sets are then randomly selected and intersected in a tree structure referred to herein as an intersection tree. Each leaf node of the intersection tree stores the intersection of several candidate sets. Data points in a leaf node are therefore elements of all the corresponding candidate sets used to grow the leaf node; due to their tendency to be repeatedly grouped together by the random forest, as revealed by their presence in the same leaf node, these data points therefore exhibit a high measure of similarity. For clarity in the following description, the term "leaf node" refers to the end nodes of an intersection tree, while leaf nodes of a decision tree (e.g., as produced by a random forest classifier) are referred to as subsets $\gamma_i$.

Advantageously, varying the parameters of RIL changes the coarseness of the revealed structure, creating a full hierarchy of clusters. By producing a hierarchy, the hierarchical cluster analyzer overcomes a limitation of certain prior-art clustering algorithms (e.g., k-means) that require the number of clusters as an input to the algorithm. More specifically, visualizing data sets in many dimensions is challenging, and therefore it may not be feasible to visually inspect the data points to determine the number of clusters that the prior-art algorithm should identify.

Furthermore, as each candidate set randomly samples a different region of the data space, the hierarchical cluster analyzer advantageously reveals topological structure in a scale-independent manner. Due to this scale independence, the hierarchical cluster analyzer may properly identify cluster structure missed by certain prior-art techniques. One such example presented hereinbelow includes two partially overlapped clusters; the example also demonstrates how changing RIL parameters affects the coarseness of the revealed topological structure.

In one embodiment, a method for information-based hierarchical clustering of a big data set includes stochastically partitioning the big data set to create a plurality of pseudo-partitions. The method also includes iteratively: forming a plurality of candidate sets from the pseudo-partitions, growing an intersection tree with the candidate sets, harvesting a plurality of leaf nodes from the intersection tree, and updating an association matrix according to co-occurrences of data points within each leaf node. In another embodiment, the method further includes forming a plurality of clusters of the big data set using the association matrix.

In another embodiment, a system for information-based hierarchical clustering of a big data set includes storage configured to store the big data set, a processor, and a hierarchical clustering engine implemented as machine-readable instructions stored in a memory in electronic communication with the processor, that, when executed by the processor, control the system to stochastically partition the big data set to create a plurality of pseudo-partitions, and iteratively (a) form a plurality of candidate sets from the pseudo-partitions, (b) grow an intersection tree with the candidate sets, (c) harvest a plurality of leaf nodes from the intersection tree, and (d) update an association matrix according to co-occurrences of data points within each leaf node. In another embodiment, the hierarchical clustering engine includes additional machine-readable instructions that control the system to form a plurality of clusters of the big data set using the association matrix.

DETAILED DESCRIPTION OF THE EMBODIMENTS

Definitions

The following symbols are used herein to clarify the detailed description. In addition, braces { } indicate that elements enclosed therein form a mathematical set.

$p_i$: an unlabeled data point indexed by i and including f measurements $x^{(i)}$, i.e., $p_i = \{x_1^{(i)}, \ldots, x_f^{(i)}\}$ D: a big data set of n unlabeled data points, i.e., $D = \{p_1, \ldots, p_n\}$ n: the number of unlabeled data points in D $x_1, \ldots, x_f$: the f feature variables of big data set D f: the number of feature variables $x_j^{(i)}$: one of the f measurements of an unlabeled data point $p_i$, corresponding to the feature variable $x_j$ $y_i$: a class label for distinguishing between real and synthetic data points $p_i'$: a labeled data point formed by grouping an unlabeled data point $p_i$ with a class label $y_i$ indicating that $p_i$ is included in the big data set D, i.e., $p_i' = \{y_i, p_i\} = \{y_i, x_1^{(i)}, \ldots, x_f^{(i)}\}$ $\tilde{x}_j^{(i)}$: a randomly chosen value simulating the measurement $x_j^{(i)}$ of the feature variable $x_j$ $\tilde{p}_i$: a synthetic data point formed by grouping f randomly chosen values $\tilde{x}^{(i)}$ with a class label $y_i$ indicating that the data point is synthetic, i.e., $\tilde{p}_i = \{y_i, \tilde{x}_1^{(i)}, \ldots, \tilde{x}_f^{(i)}\}$ D': a training set formed by grouping n' labeled data points, selected randomly with replacement, and ñ synthetic data points, i.e., $D' = \{p_1', \ldots, p_{n'}', \tilde{p}_1, \ldots, \tilde{p}_{\tilde{n}}\}$ ñ: the number of synthetic data points selected for the training set D' n': the number of labeled data points selected for the training set D'

$\Gamma_i$: a pseudo-partition of the big data set D, equal to a true partition of the training set D'

$\gamma_j$: one of a collection of subsets of D' forming the partition $\Gamma_i$, i.e., $\Gamma_i = \{\gamma_j\}$ such that D' equals the union of the subsets (i.e., $D' = \cup_j \gamma_j$)

t: the number of pseudo-partitions generated by the stochastic partitioning function $\Gamma$: the set of t pseudo-partitions generated by the stochastic partitioning function, i.e., $\Gamma = \{\Gamma_1, \ldots, \Gamma_t\}$ s: a candidate set formed by taking the union of subsets $\gamma_i$ randomly selected from each pseudo-partition $\Gamma_i$ b: the number of child nodes from each parent node in an intersection tree d: the depth of an intersection tree $d_{max}$: the maximum allowed depth of an intersection tree $q_i$: a leaf node from a fully-grown intersection tree g: the set of all leaf nodes harvested from a fully-grown intersection tree, i.e., $g = \{q_i\}$ N: the number of intersection trees grown from one set $\Gamma$ of pseudo-partitions $M_{ij}$: a symmetric n×n association matrix having one row and one column for each of the n data points in D θ: a threshold for establishing linkage between data points G: a simple, undirected graph formed from association matrix M $C_i$: a single cluster of data points C: the set of all clusters, i.e., $C = \{C_i\}$

DESCRIPTION

The information-based hierarchical cluster analyzer described herein may be used to perform unsupervised clustering of a big data set D containing n unlabeled data points $\{p_1, \ldots, p_n\}$. Each unlabeled data point $p_i$ contains f measurements, one for each of f feature variables $x_1, \ldots, x_f$. For clarity, each measurement $x_j^{(i)}$ has a superscript (i) denoting the data point $p_i$ to which the measurement $x_j^{(i)}$ belongs, and a subscript j denoting the corresponding feature variable $x_j$ that the measurement $x_j^{(i)}$ represents. With this notation, an unlabeled data point $p_i$ may be represented as $p_i = \{x_1^{(i)}, \ldots, x_f^{(i)}\}$. As each data point $p_i$ is unlabeled, data set D contains no response variables. Therefore, the dimensionality of the data space equals f, which may be as large as ten thousand, or more.

Figure 1:
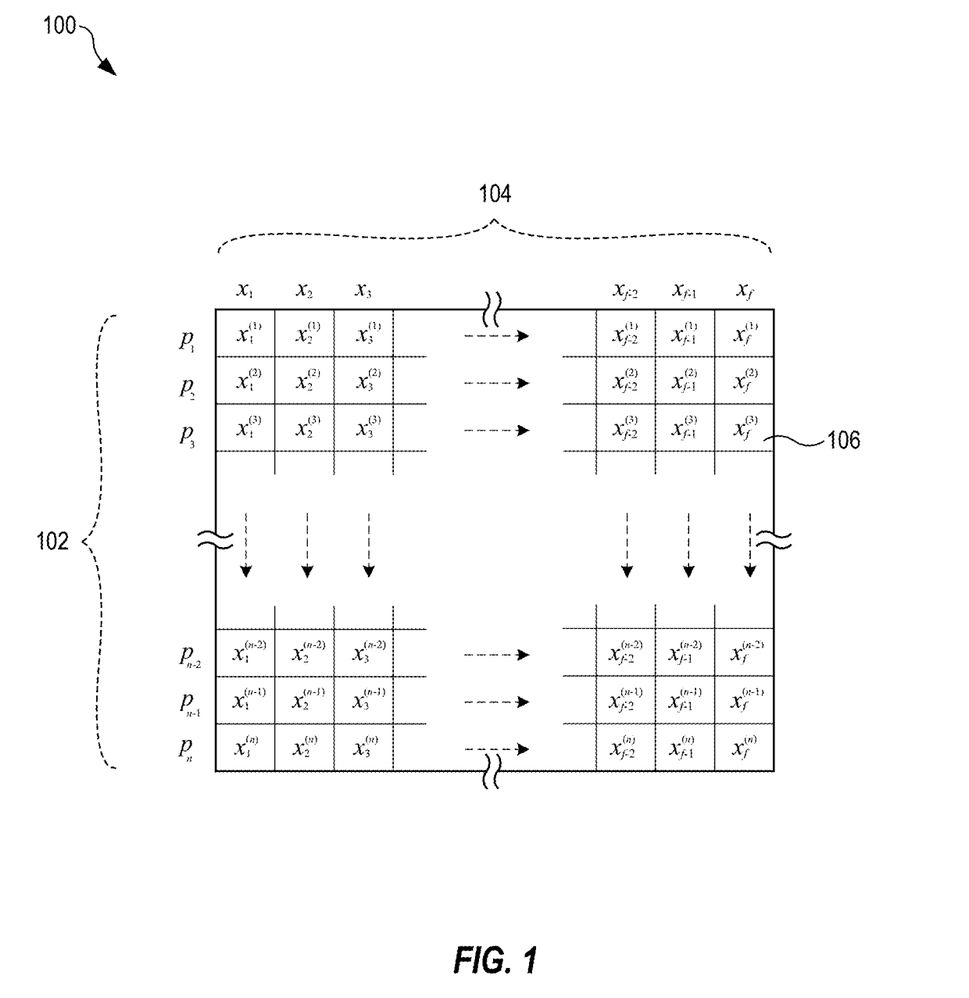
FIG. 1 shows a big data set as a data table having n rows, f columns, and n×f cells.

FIG. 1 shows the big data set D as a data table 100 having n rows 102, f columns 104, and n×f cells 106. Each unlabeled data point $p_i$ of D corresponds to one of rows 102, each feature variable $x_j$ of D corresponds to one of columns 104, and each measurement $x_j^{(i)}$ of D corresponds to one of cells 106 (only one of which is labeled in FIG. 1 for clarity). In FIG. 1, cell 106 is shown storing measurement $x_f^{(3)}$, which corresponds to unlabeled data point $p_3$ and feature variable $x_f$. For clarity, only the first three rows and last three rows of data table 100 are shown in FIG. 1, corresponding to the first three unlabeled data points $p_1, p_2, p_3$ and the last unlabeled data points $p_{n-2}, p_{n-1}, p_n$, respectively. However, the big data set D may contain millions of unlabeled data points, or more, and therefore data table 100 may contain millions of rows 102, or more. Similarly, only the first three columns and last three columns of data table 100 are shown in FIG. 1, corresponding to the first three feature variables $x_1, x_2, x_3$ and the last three feature variables $x_{n-2}, x_{n-1}, x_n$, respectively. However, the big data set D may have up to thousands of features variables, or more, and therefore data table 100 may contain thousands of columns 104, or more.

Figure 2:
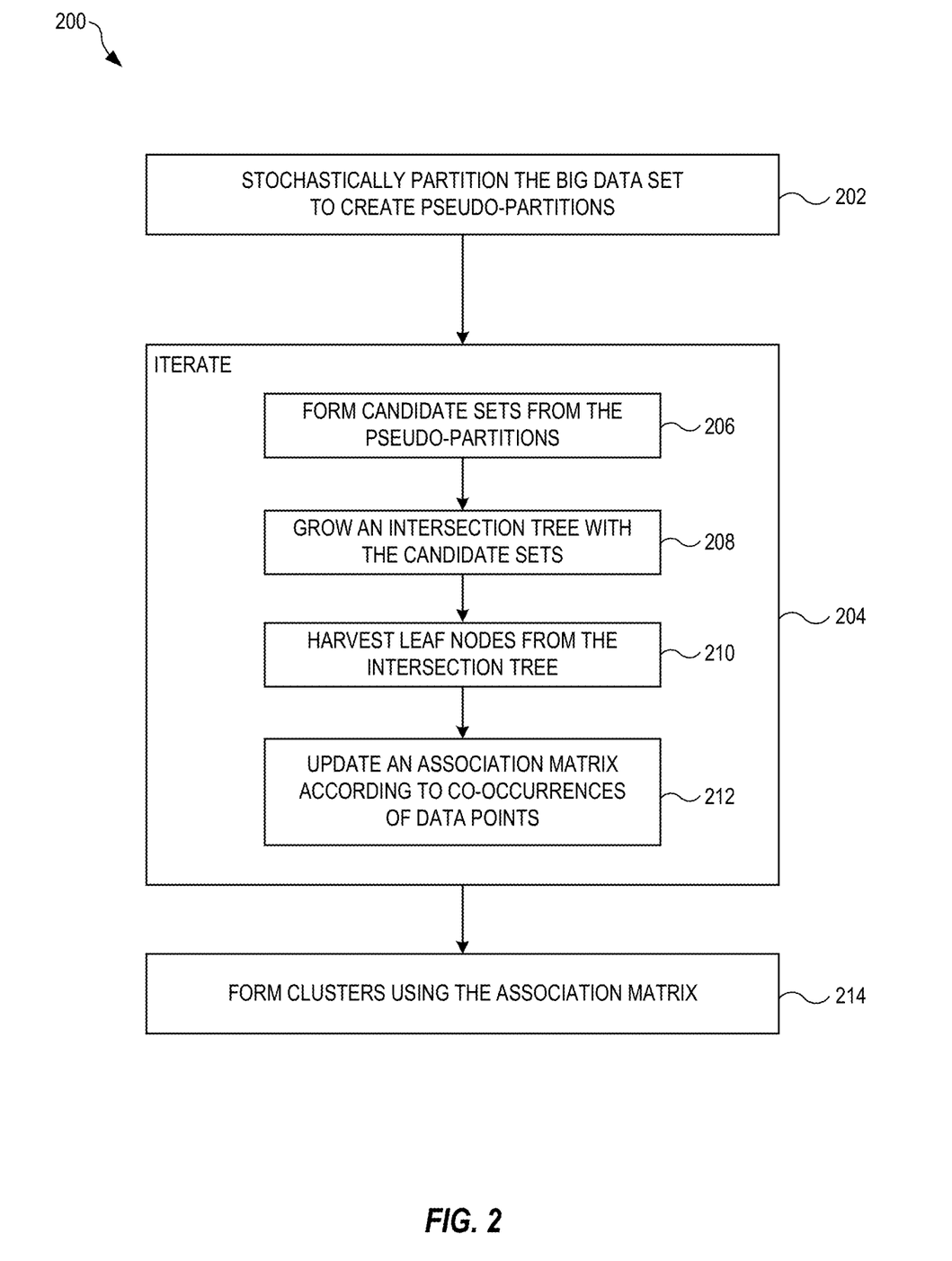
FIG. 2 is a flow chart illustrating a method for information-based hierarchical clustering of the big data set of FIG. 1, in embodiments.

FIG. 2 is a flow chart illustrating a method 200 for information-based hierarchical clustering of the big data set D. In a step 202 of method 200, an algorithm stochastically partitions the big data set D to create a plurality of pseudo-partitions $\{\Gamma_i\}$. Stochastic partitioning is described in more detail below (see FIGS. 3 and 4). A pseudo-partition $\Gamma_i$ of D is a collection of non-empty, pairwise-disjoint subsets $\{\gamma_i\}$ of D. When the union of the subsets $\{\gamma_i\}$ equals D (i.e., $\cup_j \gamma_i =$D), then the pseudo-partition $\Gamma_i$ is a true partition of D. The term "stochastically" is used herein to mean that the partitioning algorithm uses ensemble learning techniques (e.g., bootstrap aggregating) to generate, from the data set D, at least one bootstrapped data set B that is unlikely to equal D. In this case, the partitioning algorithm returns a collection of subsets that form a true partition of B, but only a pseudo-partition $\Gamma_i$ of D.

Method 200 also includes a step 204 that implements a random intersection leaves (RIL) algorithm by iterating steps 206, 208, 210, and 212. RIL is described in more detail below (see FIGS. 5 and 6). In step 206, a plurality of candidate sets $\{s_i\}$ are formed from the pseudo-partitions $\{\Gamma_i\}$ created in step 202. One candidate set s may be created by taking the union of one or more subsets $\gamma_i$ randomly selected from each pseudo-partition $\Gamma_i$. The number of subsets to be randomly selected from each pseudo-partition $\Gamma_i$ is denoted herein as m. In one embodiment, the m is fixed prior to method 200, and thus remains the same with each iteration of step 204. In another embodiment, m changes with each iteration of step 204. In another embodiment, m changes with each pseudo-partition $\Gamma_i$. For example, m may be randomly chosen with each pseudo-partition $\Gamma_i$. Alternatively, m may be determined from one or more of the parameters described herein, such as the number n of unlabeled data points, the number t of pseudo-partitions, the number of subsets forming each pseudo-partition $\Gamma_i$, the depth d of an intersection tree, the number N of intersection trees, etc. When the stochastic partitioning algorithm is a random-forest algorithm, m may also be determined from parameters of the random-forest algorithm, such as the number of trees grown in the random forest and the depth of the trees in the random forest.

Figure 5:
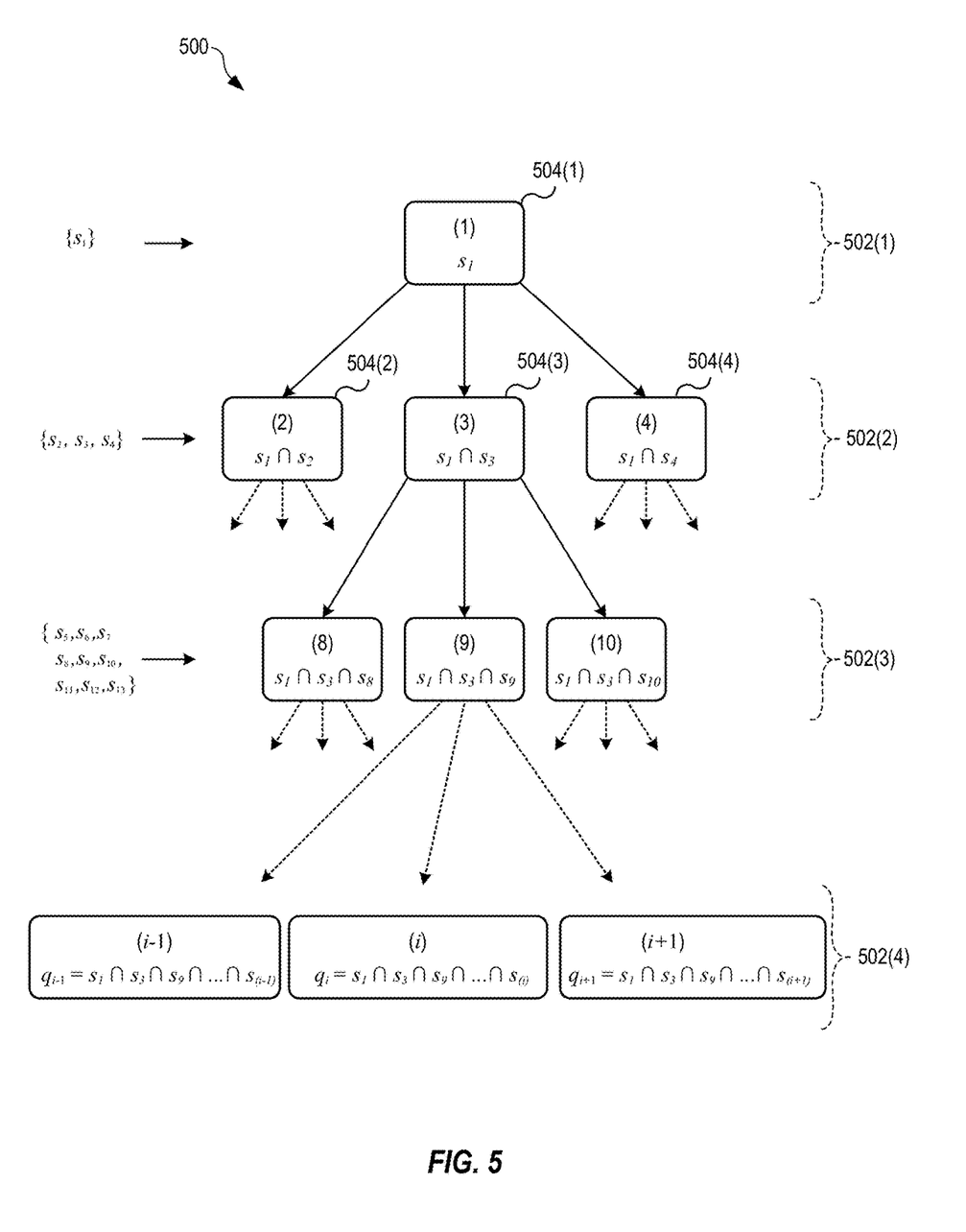
FIG. 5 shows one example of an intersection tree that uses d-fold intersections between candidate sets, in an embodiment.
Figure 6:
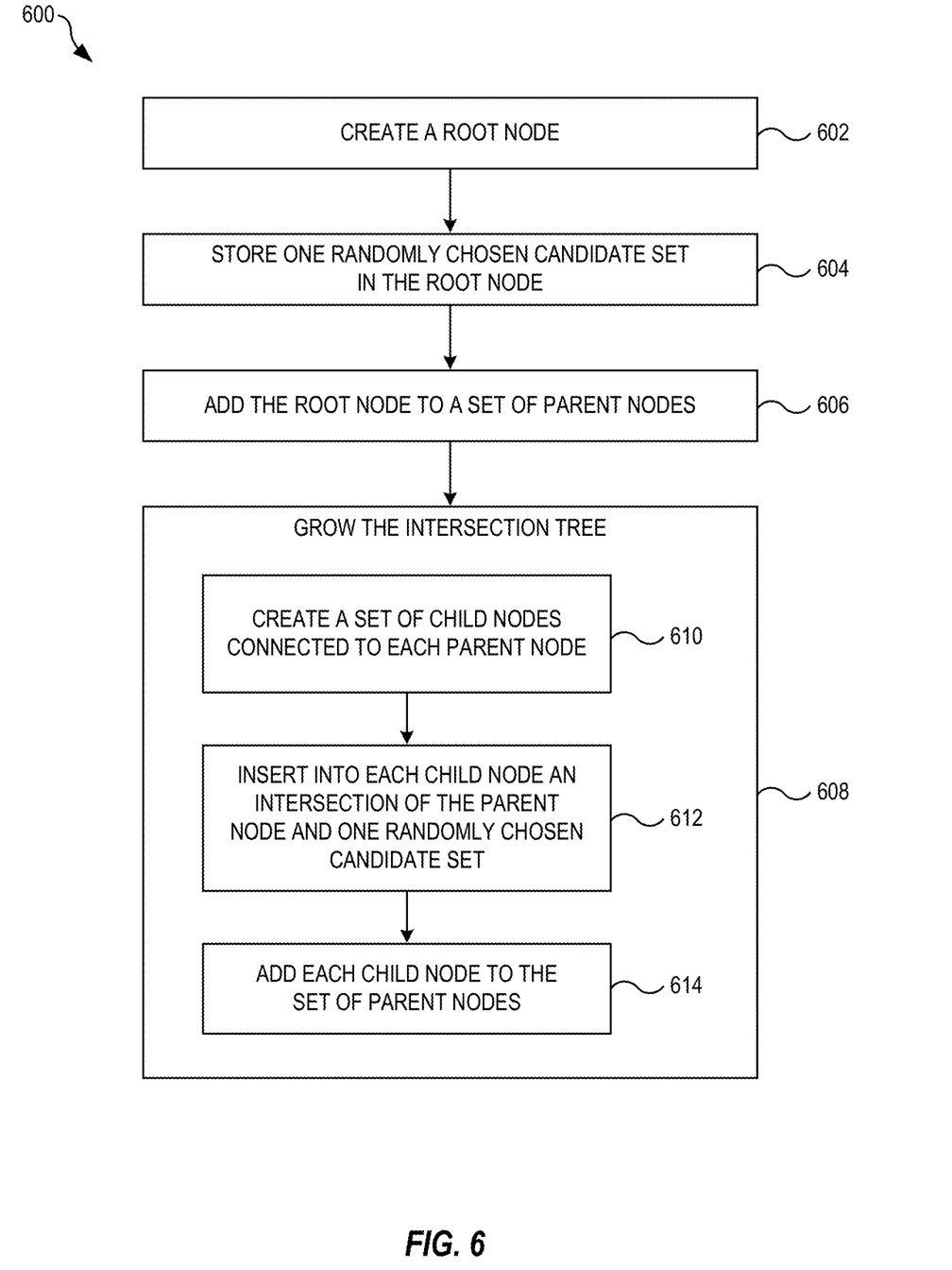
FIG. 6 is a flow chart illustrating a method for growing an intersection tree with a plurality of candidate sets, in embodiments.

In step 208, an intersection tree is grown with the candidate sets $\{s_i\}$ (see FIGS. 5 and 6). In step 210, a plurality of leaf nodes $q_i$ are harvested from the intersection tree grown in step 208. The term "harvested" is used herein to mean that the leaf nodes $q_i$ are detached from the intersection tree to form a set of leaf nodes $g=\{q_i\}$, wherein each leaf node $q_i$ is a set of data points $p_i$. In step 212, an association matrix M is updated according to co-occurrences of data points within each of the leaf nodes $q_i$. The association matrix M (see FIGS. 8-10) has n rows and n columns corresponding to the n unlabeled data points. A pair of distinct data points $\{p_k, p_l\}$ co-occur when both of the data points $p_k$ and $p_l$ are in the same leaf node $q_i$. For this single co-occurrence, the element $M_{k,l}$ of the association matrix is incremented by 1. The elements of M are incremented similarly by considering all pairs of data points co-occurring in each of the leaf nodes $q_i$.

In a step 214 of method 200, clusters $\{C_i\}$ are formed using the association matrix M. Forming clusters using an association matrix is described in more detail below.

Generating Pseudo-Partitions

The stochastic partitioning function described above may use an information-based measure. For example, the big data set D may be clustered by constructing decision trees. Since decision-tree construction is a supervised learning technique, whereas clustering is unsupervised, unlabeled data points from the big data set D may be converted into labeled data points by labeling each unlabeled data point as a "real" data point, i.e., the corresponding unlabeled data point belongs to the big data set D. A set of randomly-chosen data points, each labeled as "synthetic", is then combined with the "real" data points. The decision tree is then constructed to distinguish the real data points from the synthetic data points. Clustering through decision-tree learning may be expanded to a random forest classifier that employs ensemble learning techniques to improve predictive performance and reduce overfitting.

Figure 3:
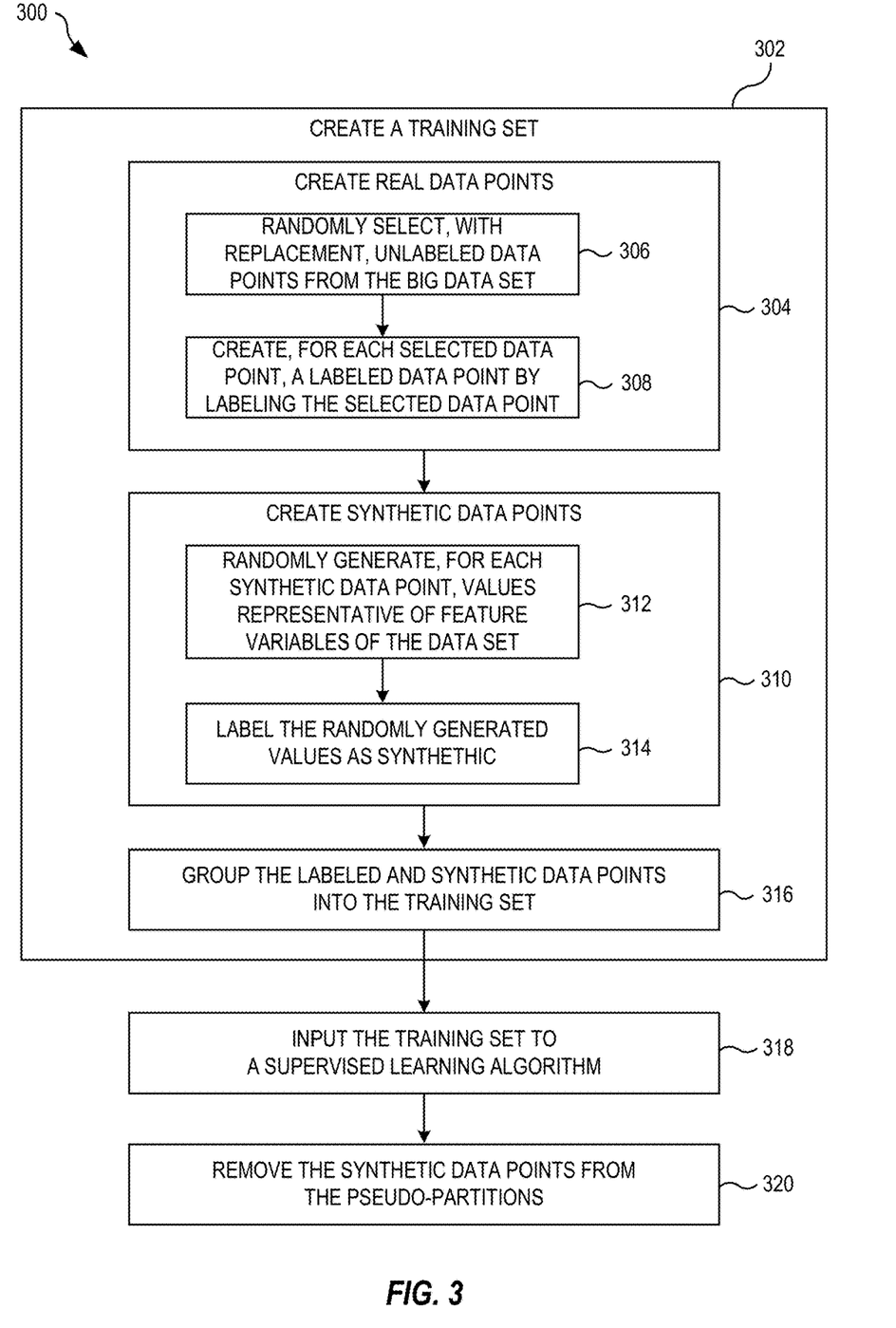
FIG. 3 is a flow chart illustrating a method for stochastically partitioning the big data set of FIG. 1 with a supervised learning algorithm, in embodiments.

FIG. 3 is a flow chart illustrating a method 300 for stochastically partitioning the big data set D with a supervised learning algorithm. Method 300 is one example of step 202 of method 200. In one embodiment, the supervised learning algorithm is a random-forest classifier.

Method 300 includes a step 302 to create a training set. Step 302 includes a step 304 to create a plurality of n' "real" data points $\{p_1', \ldots, p_n'\}$. Step 304 includes a step 306 to randomly select, with replacement, a plurality of n' unlabeled data points $\{p_i\}$ from the big data set D. Step 304 also includes a step 308 to create a labeled data point $p_i'$ by labeling each data point $p_i$ with a label $y_i$ indicating that $p_i$ is in the big data set D, i.e., $p'_i=\{y_i, p_i\}=\{y_i, x_1^{(i)}, \ldots, x_f^{(i)}\}$. The number n' of labeled data points selected in step 306 is not necessarily equal to the number n of unlabeled data points in D. Furthermore, by selecting with replacement in step 306, some unlabeled data points $p_i$ in D will be selected more than once, and others not at all.

Method 300 also includes a step 310 to create a plurality of ñ synthetic data points $\{\tilde{p}_1, \ldots, \tilde{p}_{\tilde{n}}\}$. Step 310 includes a step 312 to randomly generate, for each synthetic data point $\tilde{p}_i$, f measurements $\tilde{x}_1^{(i)}, \ldots, \tilde{x}_f^{(i)}$ representative of the f feature variables $x_1, \ldots, x_f$ of the big data set D. In step 310, the measurements $\tilde{x}_1^{(i)}, \ldots, \tilde{x}_f^{(i)}$ may be generated by randomly sampling from a product of empirical marginal distributions of feature variables $x_1, \ldots, x_f$. Step 310 also includes a step 314 to label each synthetic data point $\tilde{p}_i$ with a label $y_i$ indicating that the randomly generated measurements $\tilde{x}_1^{(i)}, \ldots, \tilde{x}_f^{(i)}$ are synthetic, or not in the data set D, i.e., $\tilde{p}_i=\{y_i, \tilde{x}_1^{(i)}, \ldots, \tilde{x}_f^{(i)}\}$.

Figure 4:
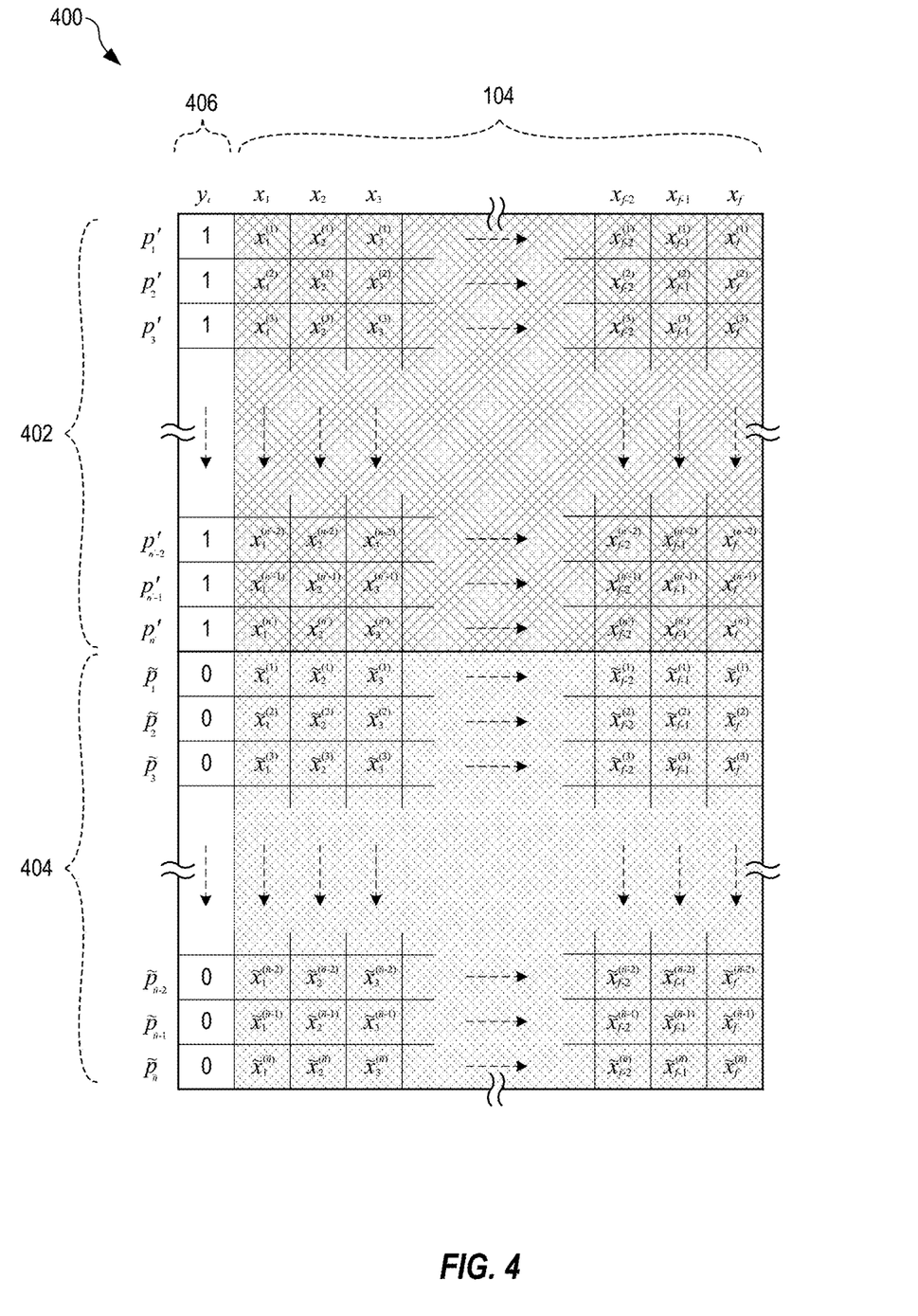
FIG. 4 shows one example of a training set generated by the method of FIG. 3, in an embodiment.

Method 300 also includes a step 316 to group the labeled data points $\{p_1', \ldots, p_n'\}$ and the synthetic data points $\{\tilde{p}_1, \ldots \tilde{p}_{\tilde{n}}\}$ into a training set D', i.e., $D'=\{p_1', \ldots, p_n', \tilde{p}_1, \ldots, \tilde{p}_{\tilde{n}}\}$ (see FIG. 4). Method 300 also includes a step 318 to input the training set D' to the supervised learning algorithm, which partitions D' into one or more pseudo-partitions $\Gamma_i$ of D. When the stochastic partitioning algorithm is a random forest classifier, the leaves of each tree of the random forest form one pseudo-partition $\Gamma_i$, each leaf of the tree corresponding to one subset $\gamma_j$ of the pseudo-partition $\Gamma_i$, i.e., $\Gamma_i=\{\gamma_j\}$. Method 300 also includes a step 320 to remove the synthetic data points $\{\tilde{p}_1, \ldots, \tilde{p}_{\tilde{n}}\}$ from the subsets $\gamma_j$ of the pseudo-partitions $\Gamma_i$. Method 300 may be repeated to form a set $\Gamma$ of t pseudo-partitions $\{\Gamma_1, \ldots, \Gamma_t\}$, i.e., $\Gamma=\{\Gamma_1, \ldots, \Gamma_t\}$.

FIG. 4 shows one example of the training set D' generated by step 304 of method 300. The training set D' is shown in FIG. 4 as a data table 400 in which the labeled data points $p_i'$ are represented as a plurality of n' rows 402, and the synthetic data points $\tilde{p}_i$ are represented as a plurality of ñ rows 404. In data table 400, labels $y_i$ form a first column 406, with the remaining f columns corresponding to the same f columns 104 of data table 100 (i.e., feature variables $x_1, \ldots, x_f$ of the big data set D). The label $y_i$ of each labeled data point $p_i'$ is shown having the value 1, and the label $y_i$ of each synthetic data point $\tilde{p}_i$ is shown having the value 0.

However, the labels $y_i$ may have other values to distinguish between real and synthetic data points without departing from the scope hereof.

Random Intersection Leaves (RIL)

RIL stochastically determines the prevalence of data points $p_i$ among the subsets $\{\gamma_i\}$ of the pseudo-partitions $\Gamma$. Given the randomness introduced by stochastic partitioning (e.g., bootstrap aggregating, feature bagging, dropout layers, stochastic pooling) it should be appreciated that subsets $\{\gamma_i\}$ forming one pseudo-partition $\Gamma_i$ may differ from subsets forming a different pseudo-partition $\Gamma_j$. Nevertheless, certain data points $p_i$ may tend to be grouped within the same subset $\gamma_i$, even in the presence of added randomness; such data points are strong candidates for members of the same cluster $C_i$.

RIL uses a plurality of candidate sets $\{s_i\}$, each formed from the union of subsets $\gamma_i$, each subset $\gamma_i$ being randomly selected from one pseudo-partition $\Gamma$. When stochastic partitioning is performed with a random forest, each candidate set $s_i$ is the union of leaf nodes from the random forest.

FIG. 5 shows one example of an intersection tree 500 that uses d-fold intersections between candidate sets $\{s_i\}$. Intersection tree 500 has a plurality of nodes 504 organized into a plurality of layers 502. A root node 504(1) occupies a first level 502(1), and a first randomly-selected candidate set $s_1$ is stored in root node 504(1).

To grow the intersection tree, b child nodes are created and linked to each parent node, and within each child node is stored the intersection of the parent node and a randomly-selected candidate set. In the example of FIG. 5, b is equal to three, and a second layer 502(2) is grown from first layer 502(1) by creating three child nodes 504(2), 504(3), 504(4) linked to root node 504(1). Three candidate sets $s_2$, $s_3$, and $s_4$ are randomly chosen, and the intersection of $s_1$ and each of $s_2$, $s_3$, and $s_4$ is stored in nodes 504(2), 504(3), and 504(4), respectively. While b=3 in FIG. 5, b may have another value without departing from the scope hereof.

Still referring to FIG. 5, a third layer 502(3) is grown from second layer 502(2) by considering nodes 504(2), 504(3), and 504(4) of second layer 502(2) as parent nodes, and growing three child nodes from each of the parent nodes 504(2), 504(3), and 504(4). Third layer 502(3) therefore has nine child nodes, of which only three are shown for clarity. Nine candidate sets (denoted $s_5$, $s_6$, $s_7$, $s_8$, $s_9$, $s_{10}$, $s_{11}$, $s_{12}$, and $s_{13}$) are randomly chosen. To fill each of the nine child nodes of third layer 502(3), one of the nine candidate sets is intersected with the content stored in the corresponding parent node, the resulting intersection being stored in the child node.

Intersection tree 500 may be grown (i.e., repeatedly forming a new layer in which b child nodes are linked to each parent node of the previous layer) to parent with a randomly chosen number of layers d, also referred to herein as tree depth. The plurality of leaf nodes $q_i$ forming dth layer 502(4) may be harvested into a set $g=\{q_i\}$ (e.g., step 210 of method 200). In one embodiment, intersection tree 500 is grown layer-by-layer until every node in a layer contains either an empty set or a singleton (i.e., $q_i$ contains only one data point). Tree depth d may be less than or equal to a maximum tree depth $d_{max}$ selected prior to growing intersection tree 500. When intersection tree 500 is grown to depth d, dth layer 502(4) contains (d−1)*b leaf nodes, each leaf node containing the intersection of d randomly chosen candidate sets $s_i$. Therefore, any non-empty leaf node of dth layer 502(4) contains data points $p_i$ that belonged to of all d candidate sets $s_i$ forming the d-fold intersection.

FIG. 6 is a flow chart illustrating a method 600 for growing an intersection tree (e.g., intersection tree 500) with a plurality of candidate sets $s_i$. Method 600 includes a step 602 to create a root node (e.g., root node 504(1)) of the intersection tree. Method 600 also includes a step 604 to insert one of the candidate sets (e.g., first candidate set $s_1$ of FIG. 5) into the root node. Method 600 also includes a step 606 to add the root node to a set of parent nodes.

Method 600 also includes a step 608 to grow the intersection tree by iterating over steps 610, 612, and 614. In step 610, for each parent node, a set of child nodes linked to the parent node is created. The parent node may be removed from the set of parent nodes after its child nodes are formed. In one example of step 610, intersection tree 500 of FIG. 5 has b=3 child nodes linked to each parent node. In step 612, an intersection of the parent node and one randomly-chosen candidate set $s_i$ is inserted into each of the child nodes. In step 614, each of the child nodes is added to the set of parent nodes. In one example of step 608, intersection tree 500 of FIG. 5 is grown with d layers, wherein step 608 iterates d−1 times over steps 610, 612, and 614.

In one embodiment, RIL is iterated N times, each iteration using the same set of pseudo-partitions $\Gamma$ to form new candidate sets $s_i$, grow a new intersection tree 500, and harvest a new set of leaf nodes $g=\{q_i\}$. Association matrix M may continue to be updated with each iteration, that is, M is not reset or altered between each of the N iterations.

RIL uses a tree-like structure to efficiently generate several leaf nodes, each containing the intersection of several randomly selected candidate sets $s_i$. However, a different type of data structure may be used to form intersections of randomly selected candidate sets $s_i$.

Hierarchical Clustering of the Association Matrix

Association matrix M represents a graph G where each data point $p_i$ represents one vertex and each matrix element $M_{ij}$ represents one edge linking the vertices corresponding to data points $p_i$ and $p_j$. Graph G is a simple graph, that is, graph G contains no multiple edges or loops, and therefore diagonal elements of association matrix M may be ignored. When association matrix M is symmetric, graph G is undirected, that is, edges have no direction associated with them.

In one embodiment, graph G is a weighted graph, wherein each matrix element $M_{ij}$ represents the weight of the edge linking the vertices of data points $p_i$ and $p_j$. Clusters $\{C_i\}$ may be formed from weighted graph G by applying, for example, techniques to find community structures in G, wherein the found community structures are the clusters $\{C_i\}$. Examples of community-finding techniques include the minimum-cut method, the Girvan-Newman algorithm, modularity maximization, statistical inference, and clique-based methods. Hierarchical clustering is another community-finding technique that may be applied to find in G a hierarchy of community structures (i.e., clusters $\{C_i\}$). The hierarchical clustering may use agglomerative clustering, such as single-linkage clustering or complete-linkage clustering.

In one embodiment, a threshold $\theta$ is applied to matrix M such that each element $M_{ij}$ less than $\theta$ is replaced with the value 0, indicating that the data points $p_i$ and $p_j$ are considered unlinked. In another embodiment, each element $M_{ij}$ greater than $\theta$ is replaced with the value 1, wherein data points $p_i$ and $p_j$ are considered fully linked. Threshold $\theta$ may be selected so as "prune" and/or smooth connectivity of clusters $\{C_i\}$ when forming clusters $\{C_i\}$ from matrix M.

In another embodiment, each element $M_{ij}$ is replaced with the value 0 or 1 when $M_{ij}$ is less than or greater than $\theta$, respectively, and each diagonal element $M_{ij}$ is set to 0. In this embodiment, matrix M is a (0,1) adjacency matrix and clusters $\{C_i\}$ may be formed from matrix M by, for example, spectral clustering. Alternatively, clusters $\{C_i\}$ may be determined from matrix M by identifying chains of fully linked data points.

In embodiments, graph G is hierarchically clustered by computing betweenness centrality of the edges of graph G, as disclosed by M. Girvan and M. E. J. Newman in "Community structure in social and biological networks," Proc. Natl. Acad. Sci. U.S.A. vol. 99, pp. 7821-7826 (2002), which is incorporated herein by reference. Betweenness centrality of an edge is a measure of the influence, or centrality, of the edge over the flow of information through other edges. Clusters that are loosely connected to each other are linked via edges having high centrality, as information flow between such clusters must go through a relatively small number of edges. Clusters may be formed divisively by successively removing from G those edges with the highest centrality, thereby breaking up G into disjoint subgraphs. This process of removing edges from G may be repeated, with each removed edge breaking up the clusters into smaller subgraphs. The process may be repeated until there are no edges left in G. The order in which edges were removed from G may then be used to form a hierarchical tree from which clusters $\{C_i\}$ may be agglomeratively combined.

Demonstration

Presented in this section is a demonstration showing embodiments advantageously resolving the underlying structure of two partially overlapped clusters. This task is known to challenge many prior-art clustering algorithms, which usually report overlapped clusters as one cluster.

Figure 7:
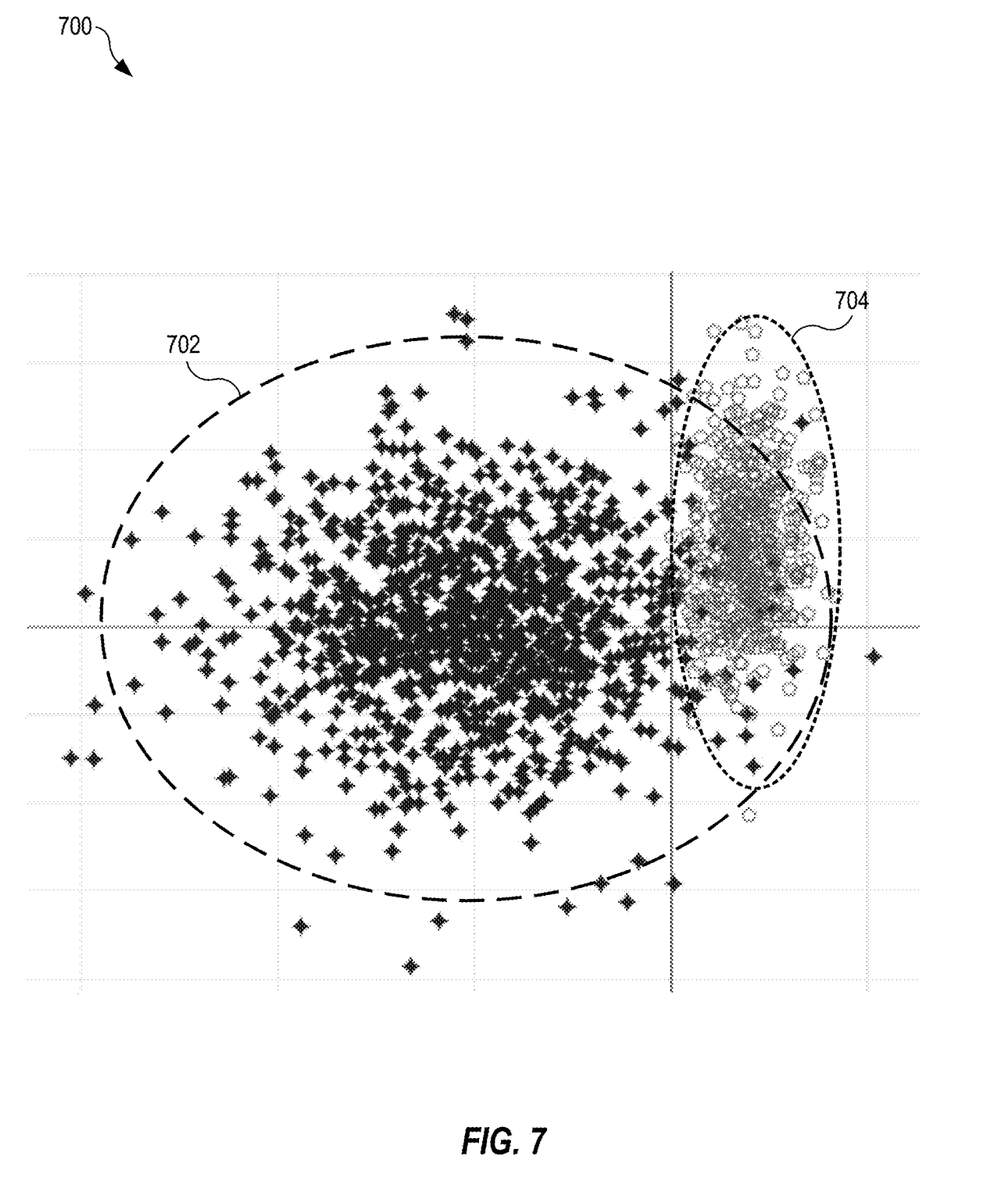
FIG. 7 is a two-dimensional scatter plot showing overlapped first and second clusters.

FIG. 7 is a two-dimensional scatter plot 700 showing overlapped first and second clusters 702 and 704, respectively. First cluster 702 is formed from 1,000 randomly generated data points, and second cluster 704 is formed from 500 randomly generated data points. For clarity, data points of first cluster 702 are represented as filled diamonds, and data points of second cluster 704 are represented as open pentagons.

To generate pseudo-partitions (e.g., step 202 of method 200), the 1,500 data points were grouped with 1,000 synthetic data points into a training set that was inputted to a random forest classifier (e.g., steps 302 and 318 of method 300). The random forest was grown to depths up to fifteen layers. Candidate sets were formed (e.g., step 206 of method 200) from the union of three subsets, each randomly selected from three trees (i.e., pseudo-partitions $\Gamma_i$) of the random forest. Twenty-five intersection trees were grown (i.e., N=25), each to a depth of three layers (i.e., d=3).

Figure 8:
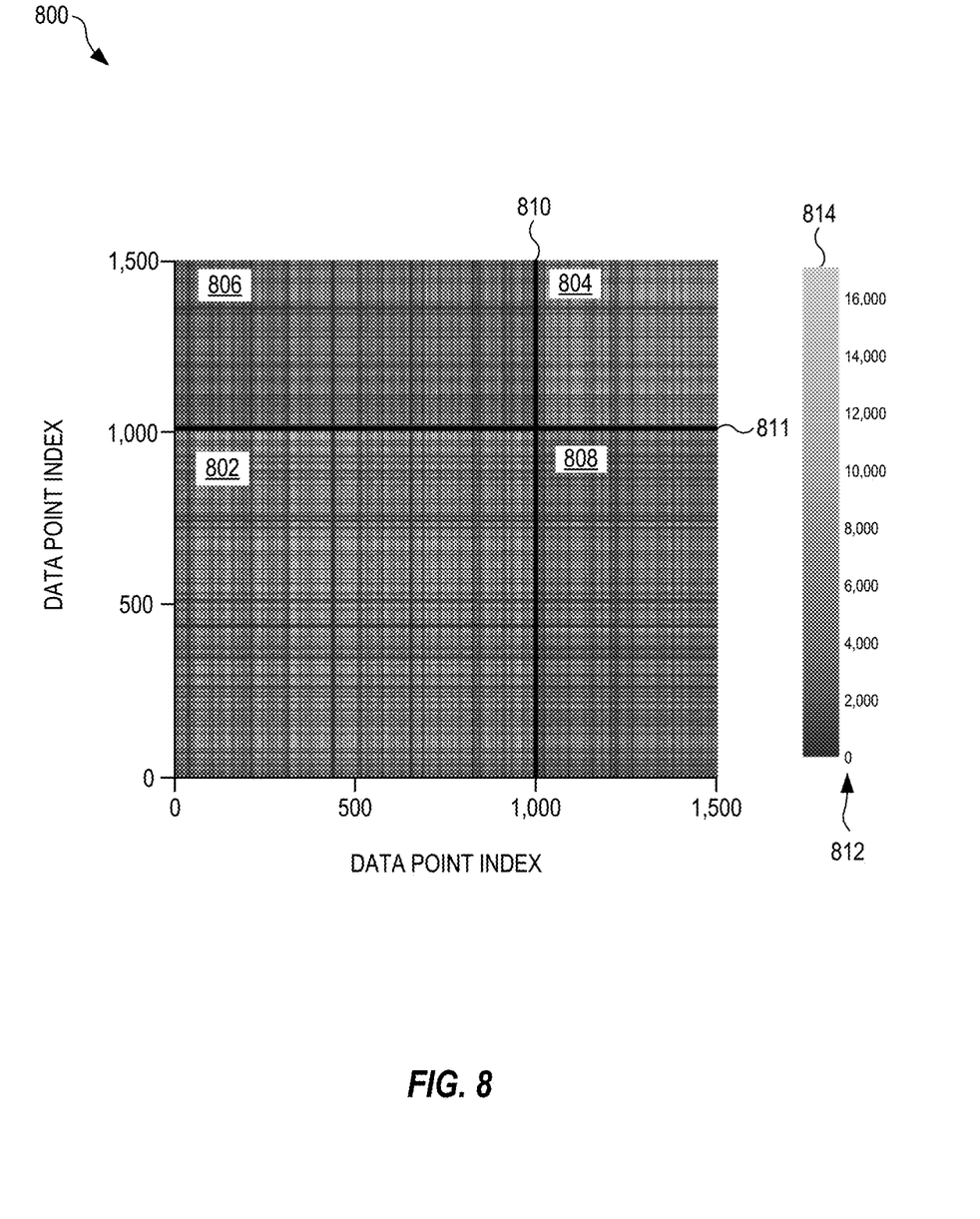
FIGS. 8-10 show visualizations of an association matrix for three different random forests, in embodiments.
Figure 9:
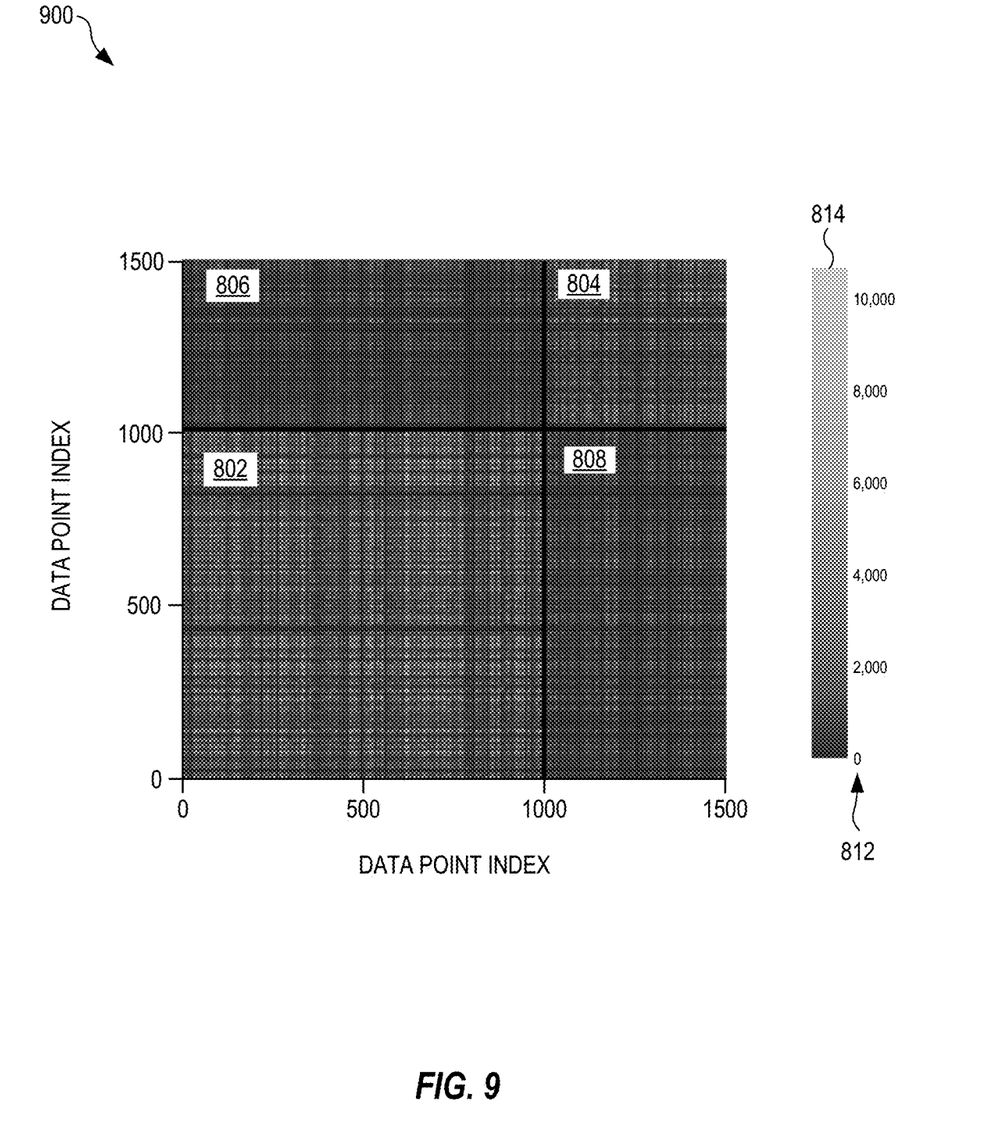
Figure 10:
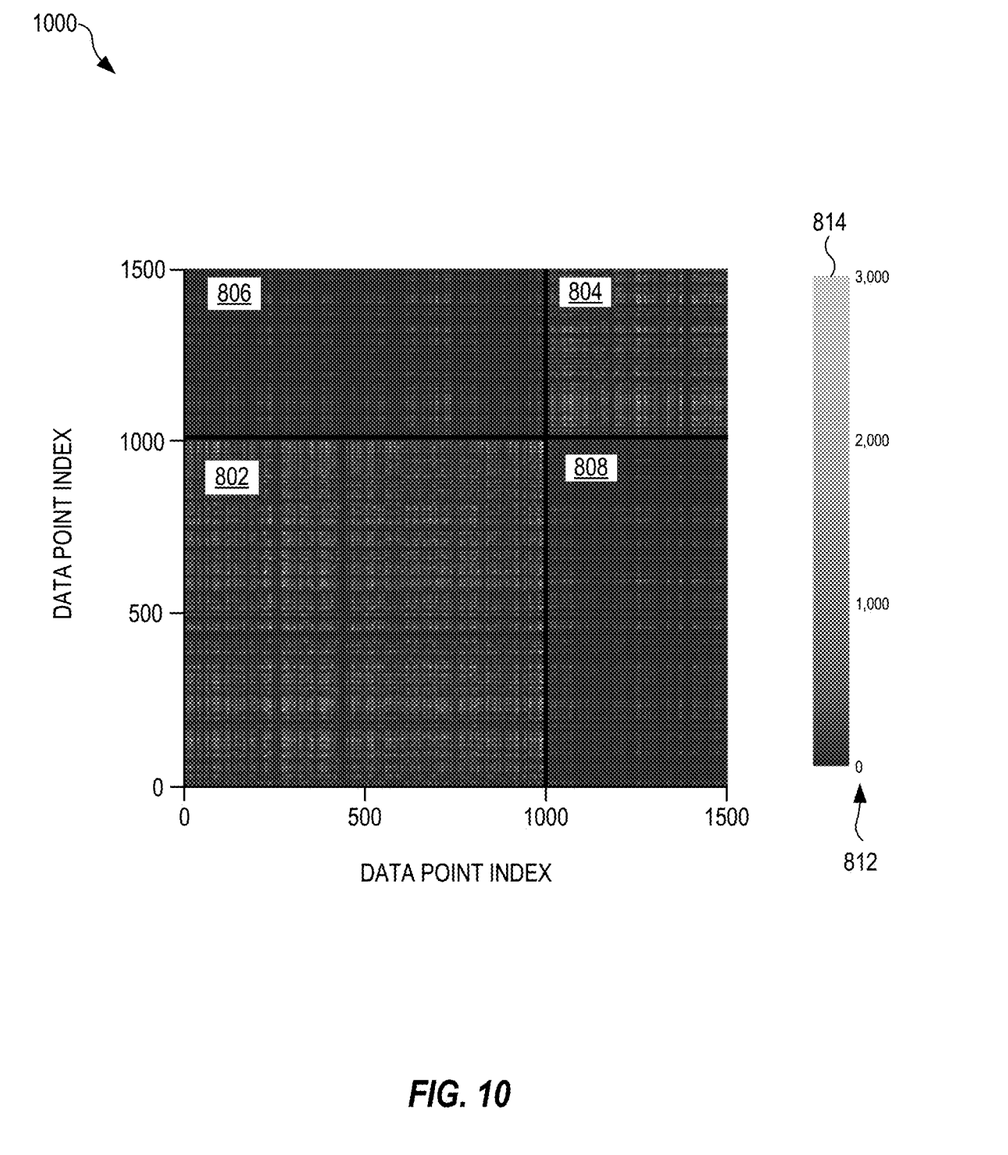

FIGS. 8, 9, and 10 show visualizations 800, 900, and 1000, respectively, of the association matrix M for three different random forests. The number of co-occurrences 812 is represented in visualizations 800, 900, and 1000 by intensity, with whiter points corresponding to a greater number of co-occurrences 812 (see intensity scale 814). Each data point in FIG. 7 is indexed with an integer between 1 and 1,500, with data points in first cluster 702 having an index between 1 and 1,000, and data points in second cluster 704 having an index between 1,001 and 1,500. Visualizations 800, 900, and 1000 are divided into four blocks by a vertical line 810 and a horizontal line 811. A block 802 represents association matrix elements for pairs of data points from first cluster 702, and a block 804 represents association matrix elements for pairs of data points from second cluster 704. Blocks 806 and 808 represent association matrix elements for pairs of data points where one data point is from first cluster 702 and the other data point is from second cluster 704. As association matrix M is symmetric, block 806 is the transpose of block 808.

To generate visualization 800 of FIG. 8, trees of the random forest were grown to a depth of ten layers. In visualization 800, blocks 804, 806, and 808 have similar intensities, on average, indicating that each data point of second cluster 704 is as likely to co-occur with a data point of first cluster 702 as with a data point of second cluster 704. In this case, the structure between first and second clusters is not fully resolved. Dark lines in visualizations 800, 900, and 1000 correspond to outlier data points that infrequently co-occurred with other data points of the same cluster.

To generate visualization 900 of FIG. 9, trees of the random forest were grown to a depth of twelve layers. The greater number of layers decreases the number of data points in the corresponding pseudo-partition subsets $\gamma_i$, allowing RIL to reveal smaller structural features in the data. In visualization 900, blocks 806 and 808 appear darker than blocks 802 and 804, indicating that fewer data points of one cluster co-occur with data points of the other cluster. In other words, the structure between first and second clusters 702, 704 is better resolved in visualization 900, as compared to visualization 800.

To generate visualization 1000 of FIG. 10, trees of the random forest were grown to a depth of fifteen layers, although some branches reached purity (i.e., empty sets) before the fifteenth layer. Compared to visualization 900, the greater number of layers further decreases the number of data points in the corresponding subsets $\gamma_i$, thereby decreasing the number of co-occurrences in all four blocks of visualization 1000. However, in visualization 1000, blocks 806 and 808 appear darker than in visualization 900, indicating that first and second clusters 702, 704 are well-resolved.

Hardware Implementation

Figure 11:
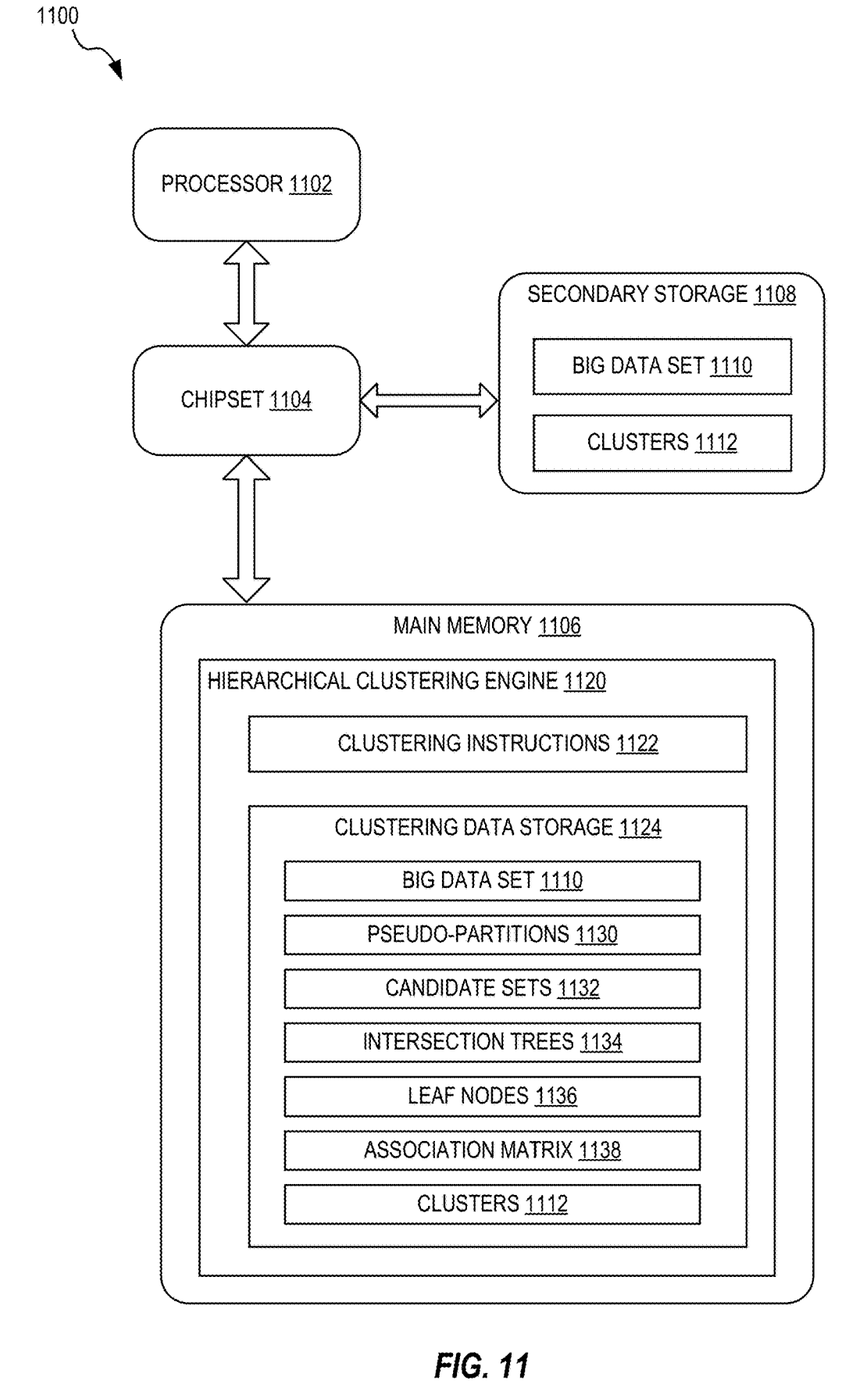
FIG. 11 shows one example of a computing system on which embodiments described herein may be implemented.

FIG. 11 shows one example of a computing system 1100 on which embodiments described herein may be implemented. Computing system 1100 includes a processor 1102, chipset 1104, main memory 1106, and secondary storage 1108. Main memory 1106 is faster and has a smaller capacity than secondary storage 1108. For example, main memory 1106 may be RAM located proximate to processor 1102, and secondary storage 1108 may be a hard disk drive or solid-state drive. Other forms of main memory 1106 and/or secondary storage 1108 may be used without departing from the scope hereof.

Processor 1102 may include one or more cores, cache memory, a memory management unit, and other components for assisting processor 1102 with carrying out machine-readable instructions. For example, processor 1102 may be a central processing unit (CPU), graphics processing unit (GPU), field-programmable gate array (FPGA), or system-on-chip (SoC). Chipset 1104 manages data flow between processor 1102, main memory 1106, and secondary storage 1108, and may be a single chip or multiple chips (e.g., northbridge and southbridge chips). Chipset 1104 may also be integrated onto the same chip as processor 1102, wherein processor 1102 connects directly to main memory 1106 and secondary storage 1108.

Main memory 1106 stores machine-readable instructions to be executed by processor 1102 and corresponding data. For example, main memory 1106 is shown in FIG. 11 storing a hierarchical clustering engine 1120 having machine-readable clustering instructions 1122. Hierarchical clustering engine 1120 also includes clustering data storage 1124 that stores a big data set 1110 (e.g., big data set D), pseudo-partitions 1130 (e.g., pseudo-partitions {$\Gamma_i$}), candidate sets 1132 (e.g., candidate sets {$s_r$}), intersection trees 1134 (e.g., intersection tree 500 of FIG. 5), leaf nodes 1136 (e.g., leaf nodes {$q_i$}), an association matrix 1138 (e.g., association matrix M), and clusters 1112 (e.g., clusters {$C_i$}).

Clustering instructions 1122 may control computing system 1100 to retrieve a portion of big data set 1110 from secondary storage 1108 when big data set 1110 is too big to fit entirely in main memory 1106. Other data may be similarly stored in, and retrieved from, secondary storage 1108 when too big to fit entirely in main memory 1106 (e.g., pseudo-partitions 1130, association matrix 1138). Clustering instructions 1122 may also control computing system 1100 to store clusters 1112 on secondary storage 1108, wherein clusters 1112 may be subsequently accessed and utilized.

In one embodiment, clustering instructions 1122, when executed by processor 1102, control computing system 1100 to stochastically partition the big data set to create a plurality of pseudo-partitions, thereby implement step 202 of method 200. Clustering instructions 1122 further control computing system to iteratively (a) form a plurality of candidate sets from the pseudo-partitions, (b) grow an intersection tree with the candidate sets, (c) harvest a plurality of leaf nodes from the intersection tree, and (d) update an association matrix according to co-occurrences of data points within each of the leaf nodes, thereby implementing step 204 of method 200 (i.e., steps 206, 208, 210, and 212).

In one embodiment, clustering instructions 1122 further control computing system 1100 to form a plurality of clusters of the big data set using the association matrix, thereby implementing step 214 of method 200. In other embodiments, clustering instructions 1122 control computing system 1100 to implement method 300 and/or method 600.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for information-based hierarchical clustering of a big data set comprising n data points lying in a f-dimensional space, wherein n is a number of the data points and f is a number of feature variables, said method comprising:
   stochastically partitioning the big data set to create pseudo-partitions;
   forming a plurality of candidate sets from the pseudo-partitions;
   growing an intersection tree with the plurality of candidate sets such that each of a plurality of leaf nodes of the intersection tree stores an intersection of several of the plurality of candidate sets;
   updating an association matrix based at least in part on co-occurrences of the data points within each of the plurality of leaf nodes, wherein a number of rows of the association matrix and a number of columns of the association matrix equal n;
   clustering, after said updating, the association matrix to identify a plurality of clusters of the data points; and
   outputting one or more of the plurality of clusters.

2. The method of claim 1, further comprising iterating, after said stochastically partitioning and prior to said clustering, over said forming, said growing, and said updating.

3. The method of claim 1, wherein said forming the plurality of candidate sets includes iteratively:
   randomly selecting one or more subsets from each of the pseudo-partitions; and
   forming a union of the selected one or more subsets to create one of the plurality of candidate sets.

4. The method of claim 3, further comprising determining a number of the one or more subsets to be randomly selected from each of the pseudo-partitions.

5. The method of claim 1, wherein said growing the intersection tree includes:
   creating a root node of the intersection tree;
   inserting one of the plurality of candidate sets into the root node;
   adding the root node to a set of parent nodes; and
   iteratively:
      creating, for each parent node of the set of parent nodes, a set of child nodes connected to said each parent node;
      inserting, into each of the child nodes, an intersection of said each parent node and a randomly chosen one of the plurality of candidate sets; and
      adding each of the child nodes to the set of parent nodes.

6. The method of claim 5, further comprising selecting a number of child nodes to be created for each parent node.

7. The method of claim 1, wherein said updating the association matrix includes incrementing by one, for each pair of data points in each of the plurality of leaf nodes, an element of the association matrix associated with said each pair of data points.

8. The method of claim 1, wherein said stochastically partitioning the big data set includes iteratively:
   randomly selecting, with replacement, a plurality of unlabeled data points from the big data set;
   creating, for each unlabeled data point of the plurality of unlabeled data points one of a plurality of labeled data points by labeling said each unlabeled data point to indicate that said each unlabeled data point is in the big data set;
   creating a plurality of synthetic data points by:
      randomly generating, for each synthetic data point of the plurality of synthetic data points, f values representative of the f feature variables; and
      labeling the f values as synthetic;
   grouping the plurality of labeled data points and the plurality of synthetic data points into a training set;
   inputting the training set to a supervised learning algorithm to generate at least one of the pseudo-partitions; and
   removing the plurality of synthetic data points from the at least one of the pseudo-partitions.

9. The method of claim 8, the supervised learning algorithm being a random forest classifier.

10. A system for information-based hierarchical clustering of a big data set, comprising:
    storage configured to store the big data set, the big data set comprising n data points lying in a f-dimensional space, wherein n is a number of the data points and f is a number of feature variables;
    a processor; and
    a hierarchical clustering engine, implemented as machine-readable instructions stored in a memory in electronic communication with the processor, that, when executed by the processor, control the system to:
stochastically partition the big data set to create pseudo-partitions,
form a plurality of candidate sets from the pseudo-partitions,
grow an intersection tree with the plurality of candidate sets such that each of a plurality of leaf nodes of the intersection tree stores an intersection of several of the plurality of candidate sets,
update an association matrix based at least in part on co-occurrences of the data points within each of the plurality of leaf nodes, wherein a number of rows of the association matrix and a number of columns of the association matrix equal n,
cluster, after the association matrix is updated, the association matrix to identify a plurality of clusters of the data points, and
output one or more of the plurality of clusters.

11. The system of claim 10, the hierarchical clustering engine including additional machine-readable instructions that, when executed by the processor, control the system to iterate the machine-readable instructions that form, grow, and update.

12. The system of claim 10, wherein the machine-readable instructions that, when executed by the processor, control the system to form a plurality of candidate sets include machine-readable instructions that, when executed by the processor, control the system to iteratively:
randomly select one or more subsets from each of the pseudo-partitions, and
form a union of the selected one or more subsets to create one of the plurality of candidate sets.

13. The system of claim 12, the hierarchical clustering engine including additional machine-readable instructions that, when executed by the processor, control the system to determine a number of the one or more subsets to be randomly selected from each of the pseudo-partitions.

14. The system of claim 10, wherein the machine-readable instructions that, when executed by the processor, control the system to grow an intersection tree includes machine-readable instructions that, when executed by the processor, control the system to:
create a root node of the intersection tree,
insert one of the plurality of candidate sets into the root node,
add the root node to a set of parent nodes, and
iteratively:
create, for each parent node of the set of parent nodes, a set of child nodes connected to said each parent node,
insert, into each of the child nodes, an intersection of said each parent node and a randomly chosen one of the plurality of candidate sets, and
add each of the child nodes to the set of parent nodes.

15. The system of claim 10, the hierarchical clustering engine including additional machine-readable instructions that, when executed by the processor, control the system to select a number of child nodes to be created for each parent node.

16. The system of claim 10, wherein the machine-readable instructions that, when executed by the processor, control the system to update the association matrix includes machine-readable instructions that, when executed by the system, control the system to increment by one, for each pair of data points in each of the plurality of leaf nodes, an element of the association matrix associated with said each pair of data points.

17. The system of claim 10, wherein the machine-readable instructions that, when executed by the processor, control the system to stochastically partition the big data set includes machine-readable instructions that, when executed by the processor, control the system to iteratively:
randomly select, with replacement, a plurality of unlabeled data points from the big data set,
create, for each unlabeled data point of the plurality of unlabeled data points, one of a plurality of labeled data points by labeling said each unlabeled data point to indicate that said each unlabeled data point is in the big data set,
create a plurality of synthetic data points by (i) randomly generating, for each synthetic data point of the plurality of synthetic data points, f values representative of the f feature variables, and (ii) labeling the f values as synthetic,
group the plurality of labeled data points and the plurality of synthetic data points into a training set,
input the training set to a supervised learning algorithm to generate at least one of the pseudo-partitions, and
remove the plurality of synthetic data points from the at least one of the pseudo-partitions.

18. The system of claim 17, the supervised learning algorithm being a random forest classifier.

* * * * *